US011216319B2

(12) United States Patent
Xia et al.

(10) Patent No.: US 11,216,319 B2
(45) Date of Patent: Jan. 4, 2022

(54) INTELLIGENT REAL-TIME ROBOT OPERATING SYSTEM ARCHITECTURE AND OPERATION METHOD THEREOF

(71) Applicant: HRG International Institute for Research & Innovation, Hefei (CN)

(72) Inventors: Kerui Xia, Hefei (CN); Liang Ding, Hefei (CN); Pengfei Liu, Hefei (CN); Zhenzhong Yu, Hefei (CN); Yanan Zhang, Hefei (CN); Fei Wang, Hefei (CN); Qi Hou, Hefei (CN); Taogeng Zhang, Hefei (CN)

(73) Assignee: HRG INTERNATIONAL INSTITUTE FOR RESEARCH & INNOVATION, Hefei (CN)

( * ) Notice: Subject to any disclaimer, the term of this patent is extended or adjusted under 35 U.S.C. 154(b) by 0 days.

(21) Appl. No.: 17/016,396

(22) Filed: Sep. 10, 2020

(65) Prior Publication Data
US 2020/0409774 A1    Dec. 31, 2020

(30) Foreign Application Priority Data

Jun. 15, 2020    (CN) .......................... 202010545552.6

(51) Int. Cl.
*G06F 13/14* (2006.01)
*G06F 9/54* (2006.01)
*G06F 9/48* (2006.01)

(52) U.S. Cl.
CPC ............ *G06F 9/545* (2013.01); *G06F 9/4812* (2013.01); *G06F 9/544* (2013.01)

(58) Field of Classification Search
CPC ........ G06F 9/545; G06F 9/4812; G06F 9/544; G06F 9/54; B25J 9/1602; B25J 9/1656
See application file for complete search history.

(56) References Cited

U.S. PATENT DOCUMENTS

| 2002/0078121 A1* | 6/2002 | Ballantyne ............ G06F 9/4812 718/102 |
| 2009/0157936 A1* | 6/2009 | Goss ..................... G06F 9/4812 710/264 |

(Continued)

OTHER PUBLICATIONS

Tobias Simon et al. ("A Lightweight Message-based Inter-Component Communication Infrastructure" (Year: 2013).*

(Continued)

*Primary Examiner* — Doon Y Chow
*Assistant Examiner* — Abdou K Seye

(57) ABSTRACT

An Intelligent Real-Time Robot Operating System (IRT-ROS) architecture and an operation method thereof are provided. The IRT-ROS architecture includes a General-Purpose OS kernel, a Real-Time OS kernel, and an Inter-processor Interrupt interface. The General-Purpose OS kernel is configured to run a General-Purpose OS to execute a non-real-time process. The Real-Time OS kernel is configured to run a Real-Time OS to execute a real-time process. The IPI interface is connected between the General-Purpose OS kernel and the Real-Time OS kernel, and is configured to support communication between the non-real-time process and the real-time process. The AIRT-ROS architecture allows Linux and RTERS to respectively execute non-real-time process and real-time process, and to respectively respond IRQ of non-real-time devices and IRQ of real-time devices. Communications between non-real-time process and real-time process are supported. Therefore, the workload for driving the general-purpose external devices is greatly reduced.

6 Claims, 7 Drawing Sheets

(56) References Cited

U.S. PATENT DOCUMENTS

2014/0082240 A1* 3/2014 Coleman ............. G06F 9/45558
710/260
2017/0203436 A1* 7/2017 Wei ....................... G06F 9/4887
2020/0334065 A1* 10/2020 Wang ........................ G06F 9/52

OTHER PUBLICATIONS

Hongxing Wei et al ("RGMP-ROS: a Real-time ROS Architecture of Hybrid RTOS and GPOS on Multi-core Processor", (Year: 2014).*

* cited by examiner

INTELLIGENT REAL-TIME ROBOT OPERATING SYSTEM ARCHITECTURE AND OPERATION METHOD THEREOF

BACKGROUND OF THE INVENTION

Field of the Invention

The present invention relates to an intelligent real-time robot operating system (IRT-ROS) technical field, and more particularly to, a multi-core dual-system ROS implementing AMP architecture and an operation method thereof.

Description of Related Art

At present, most industrial robot designs are designed and developed for special scenes, specific functions, and specific environments. Due to different robot platforms have different interfaces at bottom layers, developers often need to write new applications according to new requirements of users. The maintenance costs caused by this are higher, and it is also more difficult for users to re-develop the robot's function.

In a research and development process of a conventional robot product, all software is written based on a special controller and a special control object. If hardware devices such as the controller are changed during the research and development process, it is necessary for designers to transport a Real-Time Operation System (Real-Time OS) to a new hardware device and change a control algorithm thereof. Although the existing Real-Time OS supports a cross-platform, a big workload is produced in actual applications.

Therefore, it is essential to propose an Intelligent Real-Time Robot Operating System (IRT-ROS) to solve the problem that robot control needs to simultaneously meet requirements of real-time performance of the control algorithm and compatibility of a variety of hardware, reduce the huge workload for real-time motion control and communication algorithm in bottom layer platform transportation, and coordinate multi-mode human-machine interaction and robot behavior control.

It should be noted that the above description of the technical background is merely for the purpose of facilitating a clear and complete description of technical solutions of the present invention, and is convenient for understanding by those skilled in the art. The above technical solutions should not be considered to be well-known to those skilled in the art, simply because these aspects are set forth in background section of the present invention.

SUMMARY OF THE INVENTION

In order to solve the above problems, it is an object of the present invention to provide an IRT-ROS architecture and an operation method thereof.

According to an exemplary embodiment, an IRT-ROS architecture is provided. The IRT-ROS architecture includes a General-Purpose OS kernel, a Real-Time OS kernel, and an Inter-processor Interrupt interface. The General-Purpose OS kernel is configured to run a General-Purpose OS to execute a non-real-time process. The Real-Time OS kernel is configured to run a Real-Time OS to execute a real-time process. The IPI interface is connected between the General-Purpose OS kernel and the Real-Time OS kernel, and is configured to support communication between the non-real-time process and the real-time process.

In one embodiment, the IRT-ROS further includes an external I/O Advanced Programmable Interrupt Controller (I/O APIC). The General-Purpose OS kernel further includes a first Local Advanced Programmable Interrupt Controller (LAPIC), wherein the first LAPIC is connected to the external I/O APIC and configured to respond to an Interrupt Request (IRQ) of a non-real-time device via the external I/O APIC. The Real-Time OS kernel further includes a second LAPIC, wherein the second LAPIC is connected to the external I/O APIC and configured to respond to an IRQ of a real-time device via the external I/O APIC.

In one embodiment, when all external devices connected to the IRT-ROS architecture are non-real-time devices, the IRT-ROS architecture is configured to block the IRQ from the real-time device in the Real-Time OS kernel, so that the General-Purpose OS kernel completely takes charge of an IRQ Line. When all external devices connected to the IRT-ROS architecture are real-time devices, the IRT-ROS architecture configures the external I/O APIC, so that the external I/O APIC is configured to statically send the IRQ to the Real-Time OS kernel by static distribution. When a real-time IRQ and a non-real-time IRQ are simultaneously provided on the IRQ line, the IRT-ROS architecture is configured to route all IRQs on the IRQ line to a same OS kernel, the OS kernel being the General-Purpose OS kernel or the Real-Time OS kernel.

In one embodiment, the General-Purpose OS is a Linux, and the Real-Time OS is a Real-Time Executive for Robotic Systems (RTERS).

According to another exemplary embodiment, an operation method for an IRT-ROS is provided. An IRT ROS architecture includes a General-Purpose OS kernel for running a General-Purpose OS and a Real-Time OS kernel for running a Real-Time OS. The operation method includes the following steps: communicating an RTROSCPP of the IRT-ROS architecture with ROS nodes, and respectively running the ROS nodes, core services and roslog topics on the General-Purpose OS kernel and the Real-Time OS kernel; publishing/subscribing messages between the ROS nodes via a Fast Real-Time Publish/Subscribe protocol (Fast-RTPS); and implementing the roslog topics at the RTROSCPP, and taking the roslog topics as standard outputs for the IRT-ROS architecture, such that all of the ROS nodes output information of the ROS nodes by invoking standard log services of the ROS nodes.

In one embodiment, the operation method further includes the following steps: when real-time nodes are started, communicating the real-time nodes, via a virtual network shared memory (VENT shared memory), with the ROS nodes run on the General-Purpose OS kernel. The communication scenario includes: when a real-time node is started and stopped, a state message is published to other ROS nodes on the General-Purpose OS kernel; and when a real-time node is communicated with a non-real-time node, topics are published/subscribed and messages are exchanged.

In one embodiment, the operation method further includes the following step: driving an RTERS virtual device. The step of driving an RTERS virtual device includes the following sub-steps: driving a character device pipeline driver that outputs RTERS state information under the General-Purpose OS; and driving a VENT shared memory for communication of application programs between the General-Purpose OS and the Real-Time OS.

In one embodiment, the operation method further includes the following step: transporting the ROS in the RTERS via the RTROSCPP. The step of transporting the ROS in the RTERS via the RTROSCPP includes the following sub-steps: providing, via the roscpp, ROS standard nodes communication interfaces to an application layer, including a standard NodeHandler object constructor and relevant functions, node message publisher/subscriber objects, node initialization, timing dormancy and other standard ROS function interface; deriving an Xmlrpc part from an Xmlrpc standard protocol code compiled based on a C++ language, so that real-time nodes establish network service nodes based on an Xmlrpc standard protocol; and a set of -common interface functions written by Network that combines the roscpp with the Xmlrpc allowing the Xmlrpc and the roscpp to use a standard network communication interface in a unified function call.

In one embodiment, the ROS node is used for managing nodes running on the IRT-ROS, including start registration of the nodes, node status, communication requests between the nodes, and node message routing; and the ROS node uses Xmlrpc standard protocol to communicate with other ROS nodes.

In one embodiment, the General-Purpose OS is a Linux, and the Real-Time OS is a Real-Time Executive for Robotic Systems (RTERS).

With the above technical solutions, the present invention has the following beneficial effects: the whole hardware platform resources are divided into kernels and partitions based on Asymmetric Multi-Processing (AMP); meanwhile, the stable and reliable communication between subsystems is supported; wherein one of the two sub-systems is Linux of a General-Purpose OS type, and the other of the two sub-systems is RTERS of an Real-Time OS type. Based on the AIRT-ROS architecture provided by the present invention, Linux and RTERS can respectively execute the non-real-time process and the real-time process; Linux and RTERS can respectively respond the IRQ of the non-real-time device and the IRQ of the real-time device; communications between the non-real-time process and the real-time process are supported; and a variety of drives of Linux are integrated; and therefore, the workload for driving the general-purpose external devices is greatly reduced.

In order to make the above and other objects, features, and advantages of the present invention become more apparent and obvious, hereinafter, the preferred embodiments will be described in detail with reference to the accompanying drawings.

BRIEF DESCRIPTION OF THE DRAWINGS

Aspects of the present invention are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE PRESENT INVENTION

Figure 1:
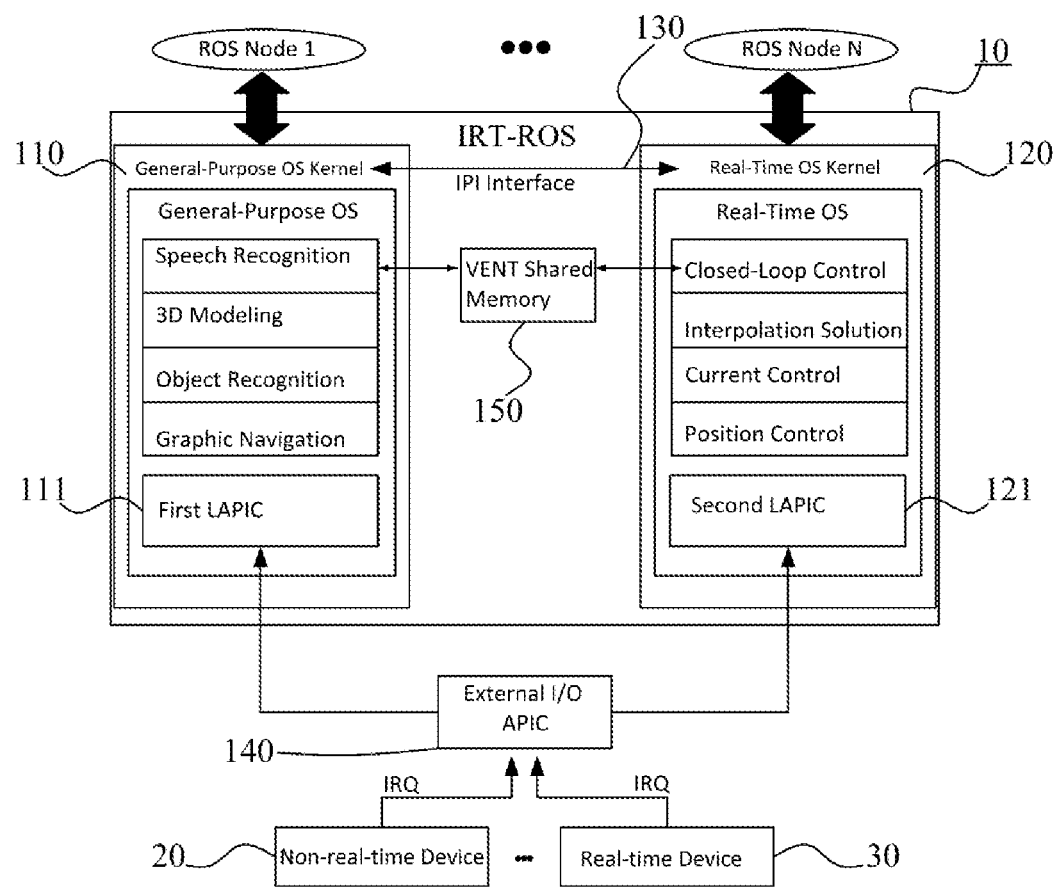
FIG. 1 is a structural diagram of an IRT-ROS architecture according to an embodiment of the present invention.

The following invention provides many different embodiments, or examples, for implementing different features of the provided subject matter. Specific examples of components and arrangements are described below to simplify the present invention. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present invention may repeat reference numerals and/or letters in the various examples. This repetition is for the purpose of simplicity and clarity and does not in itself dictate a relationship between the various embodiments and/or configurations discussed.

It should be noted that, in the description of the present invention, the terms "first", "second", etc. are used only for describing purposes and distinguishing similar objects, and there is no order between them, nor can it be understood as an indication or a hint for relative importance. Further, in the description of the present invention, the meaning of "a plurality" is two or more unless otherwise specified.

Please refer to FIG. 1. FIG. 1 is a structural diagram of an IRT-ROS architecture according to an embodiment of the present invention. The IRT-ROS architecture 10 includes a General-Purpose OS kernel 110, a Real-Time OS kernel 120 and an IPI interface 130. The General-Purpose OS kernel 110 is configured to run a General-Purpose OS to execute a non-real-time process. The Real-Time OS kernel 120 is configured to run a Real-Time OS to execute a real-time process. The IPI interface 130 is connected between the General-Purpose OS kernel 110 and the Real-Time OS kernel 120, and is configured to support communication between the non-real-time process and the real-time process.

It is to be noted that the real-time process in the IRT-ROS architecture 10 has a strict deadline for the execution of the Real-Time OS kernel 120 and its algorithm, including: closed-loop control, interpolation solution, current control, and position control. The non-real-time process has no strict deadline for the execution of the General-Purpose OS kernel 110 and its algorithm, including: speech recognition, 3D modeling, object recognition, and graphic navigation.

The General-Purpose OS kernel 110 is communicated with the Real-Time OS kernel 120 via the IPI interface 130. When the Real-Time OS kernel 120 is to issue a message to the General-Purpose OS kernel 110, the Real-Time OS kernel 120 initiates an IRQ through the IPI interface 130, and the General-Purpose OS kernel 110 receives an interrupt signal and then processes the IRQ. When the General-Purpose OS kernel 110 is to issue a message to the Real-Time OS kernel 120, the General-Purpose OS kernel 110 initiates an IRQ through the IPI interface 130, and the Real-Time OS kernel 120 receives an interrupt signal and processes the IRQ. Messages that require interaction between the Real-Time OS kernel 120 and the General-Purpose OS kernel 110 are written to a Virtual Network (VENT) shared memory 150. The two inter-kernel communications are first interrupted by one kernel initiating an IPI to notify the other kernel of reading data in the VENT shared memory 150, and then the other kernel reads the data in the VENT shared memory 150.

In one embodiment, the IRT-ROS architecture 10 may further include an external I/O APIC (I/O Advanced Programmable Interrupt Controller) 140. The General-Purpose OS kernel 110 further includes a first LAPIC (Local Advanced Programmable Interrupt Controller) 111, which is connected to the external I/O APIC 140 and configured to respond to an IRQ of a non-real-time device 20 via the external I/O APIC 140. The Real-Time OS kernel 120 further includes a second LAPIC 121, which is connected to the external I/O APIC 140 and configured to respond to an IRQ of a real-time device 30 via the external I/O APIC 140.

In the IRT-ROS architecture 10, real-time ROS nodes are connected to the real-time device 30 via a real-time bus. The ROS real-time nodes with different functions are operated according to different requirements of robot control, including position closed-loop control, current control, interpolation solution calculation, and so on. Standard ROS nodes run through various interfaces to various cameras or sensors on the robot, thus collecting information and performing functions such as object recognition and graphic navigation. Real-time nodes and non-real-time nodes can perform collaborative functions through interaction. In order to fully utilize the IRT-ROS multi-kernel dual-system features, the external I/O APIC 140 is introduced to control external devices. The external I/O APIC 140 is an interrupt router of a multi-kernel Central Processing Unit (CPU). Each of the kernels 110/120 has their own LAPICs 111/121; and all LAPICs 111/121 are connected to the external I/O APIC 140 to form a multi-APIC system. The main role of the external I/O APIC 140 is to allocate interrupt requests (IRQs) between external devices and kernels to a plurality of kernels.

It is to be noted that, when several external devices share one IRQ line, the IRT-ROS architecture 10 selects the following strategies according to different situations: 1) when all external devices connected to the IRT-ROS architecture 10 are non-real-time devices 20, the IRT-ROS architecture 10 blocks the IRQ from the real-time device 30 in the Real-Time OS kernel 120, so that the General-Purpose OS kernel 110 completely takes charge of the entire IRQ line; 2) when all external devices connected to the IRT-ROS architecture 10 are real-time devices 30, the IRT-ROS architecture 10 configures the external I/O API 140, so that the external I/O APIC 140 statically sends an IRQ to the Real-Time OS kernel 120 by static distribution; and 3) when a real-time IRQ and a non-real-time IRQ are simultaneously provided on the IRQ line, the IRT-ROS architecture 10 routes all IRQs on the IRQ line to a same OS kernel, the OS kernel being the General-Purpose OS kernel 110 or the Real-Time OS kernel 120.

In one embodiment, the General-Purpose OS is a Linux, and the Real-Time OS is a Real-Time Executive for Robotic Systems (RTERS). The above is merely exemplary description and is not intended to limit the present invention.

Figure 2:
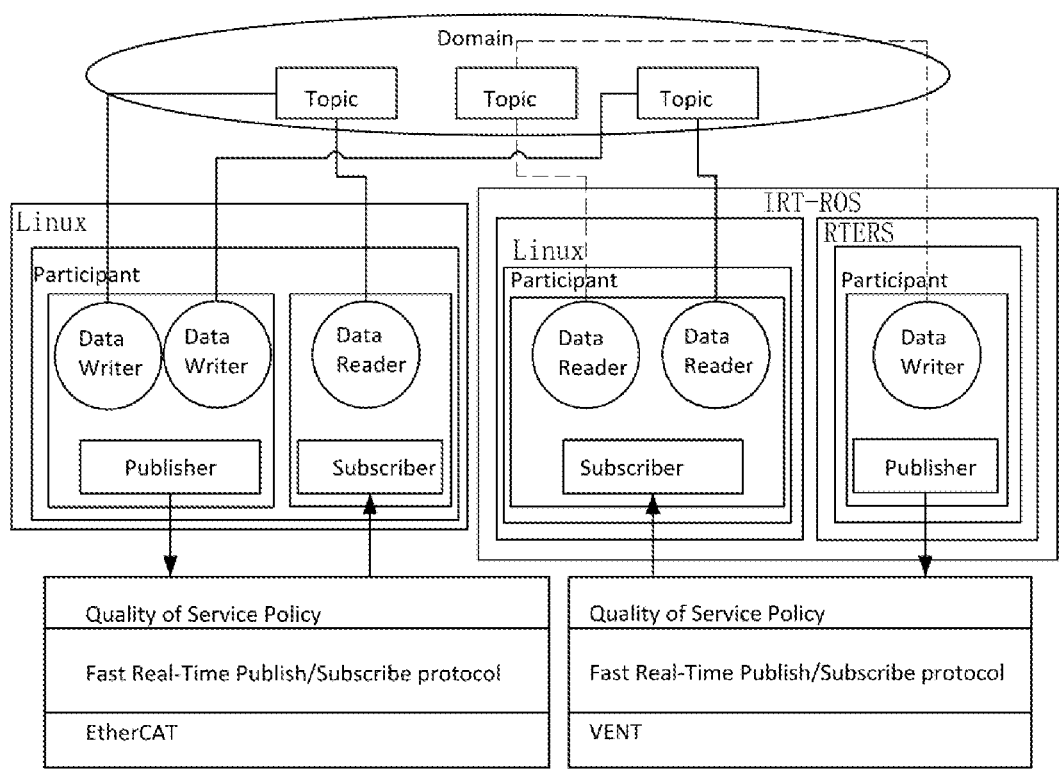
FIG. 2 is a schematic diagram of a communication framework of ROS nodes in an IRT-ROS according to an embodiment of the present invention.

Please refer to FIG. 2. FIG. 2 is a schematic diagram of a communication framework of ROS nodes in an IRT-ROS according to an embodiment of the present invention. In this embodiment, the communication framework of ROS nodes of RTROSCPP implemented in RTERS is described. The AIRT-ROS implements the RTROSCPP in RTERS, so that a robot control algorithm encapsulated in ROS may be conveniently invoked in an RTERS real-time system. 1) Users can use standard ROS programming interface on RTERS to write ROS nodes that meet user requirements and are real-time; and 2) ROS real-time nodes running on the RTERS can communicate directly with standard ROS nodes through a Fast Real-time Publish/Subscribe Protocol (Fast-RTPS) without the need for proxy nodes to forward data.

In the RTERS Real-Time OS, an operation of network communication is converted into an operation for a system file descriptor. The communication for the ROS nodes of the IRT-ROS has three scenarios: communication between standard ROS nodes, communication between real-time ROS nodes, and communication between standard ROS nodes and real-time ROS nodes. The goal of the IRT-ROS design is to complete all communications between all ROS nodes by using ROS and RTROSCPP. As shown in FIG. 2, the real-time ROS node and the non-real-time ROS node in the AIRT-ROS establish contact with each other by focusing on Topic, publishing Topic via a Publisher, subscribing Topic via a Subscriber, writing a message to Topic via a data writer, and reading a message from Topic via a data reader.

The communication between standard ROS nodes includes two parts: one is an XML-RPC communication protocol, and the other is a communication interface function encapsulated by roscpp and roscpplight core function packets. These two parts are independent from each other. The Fast-RTPS communication protocol is implemented on RTERS. By integrating a core function of XML-RPC into RTROSCPP, the standardized communication interface is implemented and run directly in the real-time system in the form of system calls. The RTERS supports message definition scripts to directly generate a C++ header file code. The real-time part of the AIRT-ROS message definition may also be performed in the standard ROS section, and then the resulting C++ header file code is placed directly in the real-time system section.

Figure 3:
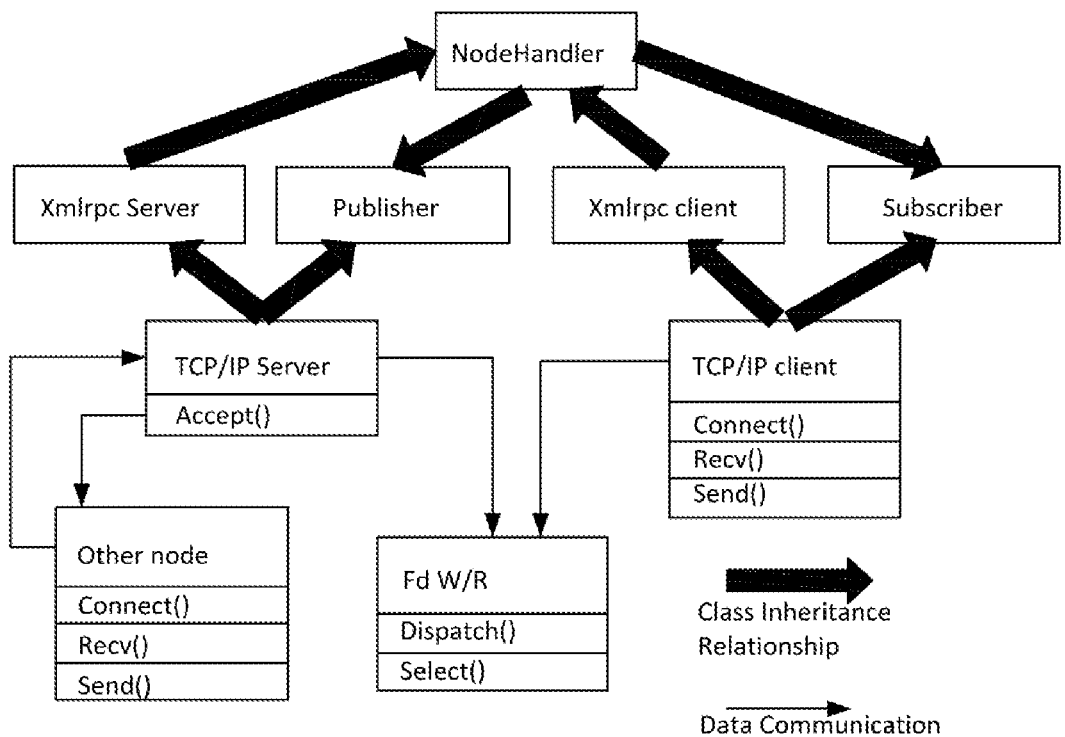
FIG. 3 is a schematic diagram for communication mode of real-time ROS nodes and the relationship between RTROSCPP classes according to an embodiment of the present invention.

Please refer to FIG. 3. FIG. 3 is a schematic diagram for communication mode of real-time ROS nodes and the relationship between RTROSCPP classes according to an embodiment of the present invention. The communication mode between real-time ROS nodes and standard ROS nodes is similar to that between standard ROS nodes: 1) Real-time nodes communicate with a main node running on a server by defining a NodeHandler type node object, which mainly aims to register necessary network information such as a node name, a network address, a domain name, a communication port and other necessary network information in the server. 2) Real-time nodes establish services by creating Publisher objects to provide a connection services to other nodes. Any node in the same domain can be applied for a connection to the real-time node to obtain a special Topic message of the real-time node. 3) Real-time nodes can also establish message receiving clients by establishing a Subscriber object, and receive specified Topic messages, sent from other external nodes in a network socket blocked manner.

All Topic message communications between ROS nodes meet the XML-RPC protocol. All messages need to be packaged in an XML-RPC message format before being sent. Upon the reception of the messages, the messages are unpacked with the same protocol, so that data communications between nodes are easier to manage, the burden of the application program developers can be reduced, and portability of programs is also improved.

Figure 4:
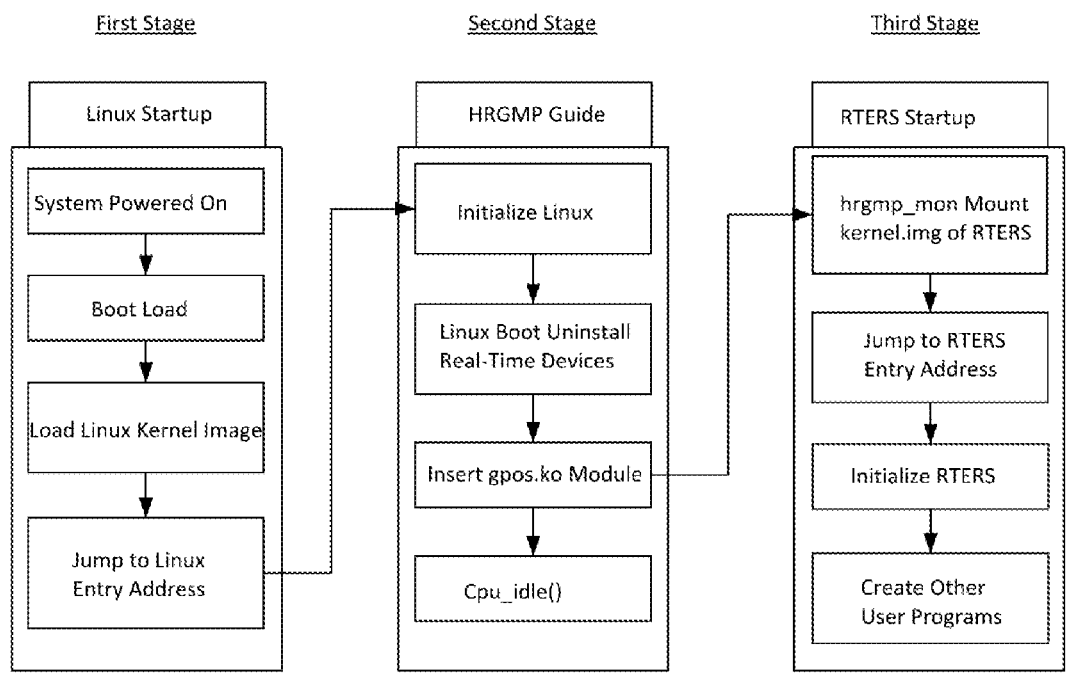
FIG. 4 is a schematic diagram of a startup process of an IRT-ROS according to an embodiment of the present invention.

Please refer to FIG. 4. FIG. 4 is a schematic diagram of a startup process of an IRT-ROS according to an embodiment of the present invention. The startup process of the IRT-ROS may be divided into three stages, in which the first stage is to complete Linux startup, the second stage is to complete HRGMP guidance, and the third stage is to complete RTERS startup to start the IRT-ROS completely. The whole startup process is as shown in FIG. 4.

In the first stage, the system is powered on, Linux system is started, and Linux initializes all resources of the system. At this time, all hardware resources, including all CPUs, memories and external devices, are managed by Linux system, and Linux initializes all devices. Certainly, the startup process of the Linux OS further includes a Linux kernel, a software library and user interaction software, etc.

In the second stage, the gpos.ko module of the IRT-ROS is started. As a core module of IRT-ROS, the gpos.ko module exists under a bin directory of the IRT-ROS software package. To start the hybrid OS, the gpos.ko module is started first to obtain all hardware resources, required by the real-time system, from the Linux. After the system is powered on, all hardware resources are managed by Linux. As a result, in order to run a new Real-Time OS "RTERS", the required resources of RTERS must be handed over to RTERS real-time system management. An independent physical address-continuous memory in the Linux kernel is used by the gpos.ko module, and Linux labels that this memory has been used. In order to allow real-time systems to communicate with non-real-time systems, a small segment of VENT shared memory is created, and such a small segment of VENT shared memory is called IRT-ROS VNET. The IRT-ROS VNET may access serial devices, block devices, pipelines, Ethernet ports, and the like as required. In addition to obtaining the memory, the gpos.ko module further calls a cpu_down( ) function to disable certain CPUs, merge tasks and interrupts that were originally running on them into other CPUs; and moreover, Linux will not give any new task to these CPUs later. Linux will continuously occupy the remaining CPUs to run programs.

In the third stage, the Real-Time OS kernel of the RTERS is started, and the transported Real-Time OS kernel is compiled into an image; and during startup, a corresponding kernel image is mounted with an IRT-ROS rgmp_mount tool, so that the Real-Time OS of the RTERS may be loaded into a separate memory, and such a segment of memory will be managed by the real-time system. To-be-controlled hardware drivers are loaded by the Real-Time OS of the RTERS. Hence, the entire IRT-ROS startup process is complete.

Figure 5:
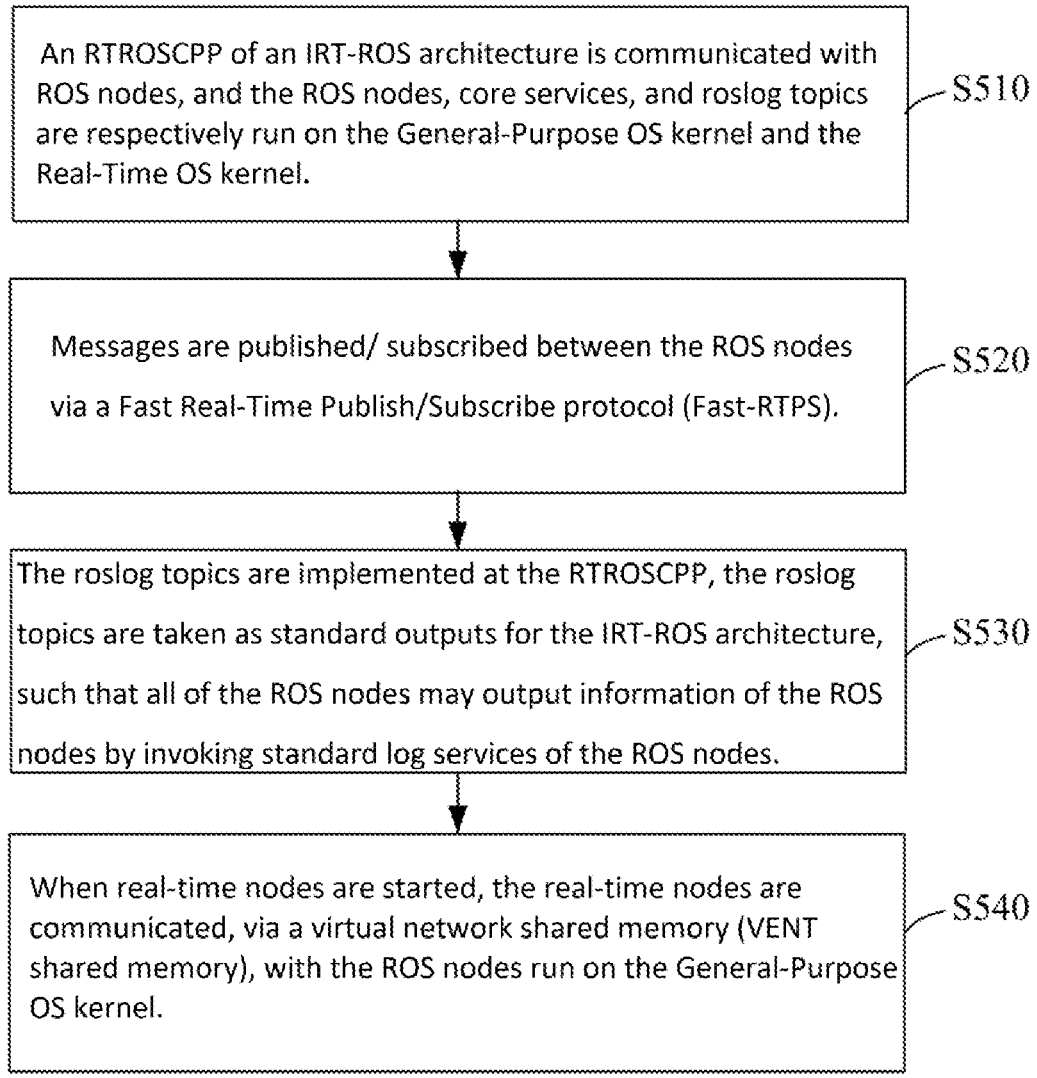
FIG. 5 is a flowchart showing an operation method of an IRT-ROS according to an embodiment of the present invention.

Please refer to FIG. 5. FIG. 5 is a flowchart showing an operation method of an IRT-ROS according to an embodiment of the present invention. An IRT-ROS architecture includes a General-Purpose OS kernel for running a General-Purpose OS and a Real-Time OS kernel for running a Real-Time OS. The operation method includes the following steps.

Step S510: An RTROSCPP of an IRT-ROS architecture is communicated with ROS nodes, and the ROS nodes, core services, and roslog topics are respectively run on the General-Purpose OS kernel and the Real-Time OS kernel.

Step S520: Messages are published/subscribed between the ROS nodes via a Fast Real-Time Publish/Subscribe protocol (Fast-RTPS).

Step S530: The roslog topics are implemented at the RTROSCPP, the roslog topics are taken as standard outputs for the IRT-ROS architecture, such that all of the ROS nodes may output information of the ROS nodes by invoking standard log services of the ROS nodes.

Step S540: When real-time nodes are started, the real-time nodes are communicated, via a virtual network shared memory (VENT shared memory), with the ROS nodes run on the General-Purpose OS kernel.

It is to be noted that, in the step S540, the communication scenario includes: when a real-time node is started and stopped, a state message is published to other ROS nodes on the General-Purpose OS kernel; and when a real-time node is communicated with a non-real-time node, topics are published/subscribed and messages are exchanged.

It is to be noted that the ROS nodes are configured to manage nodes run on the IRT-ROS, including startup registration of the nodes, node states, communication requests between the nodes, and message routing of the nodes; and the ROS nodes are communicated with other ROS nodes by using an XML-RPC protocol.

In one embodiment, the operation method further includes a step of driving an RTERS virtual device and a step of transporting ROS in the RTERS via the RTROSCPP.

Figure 6:
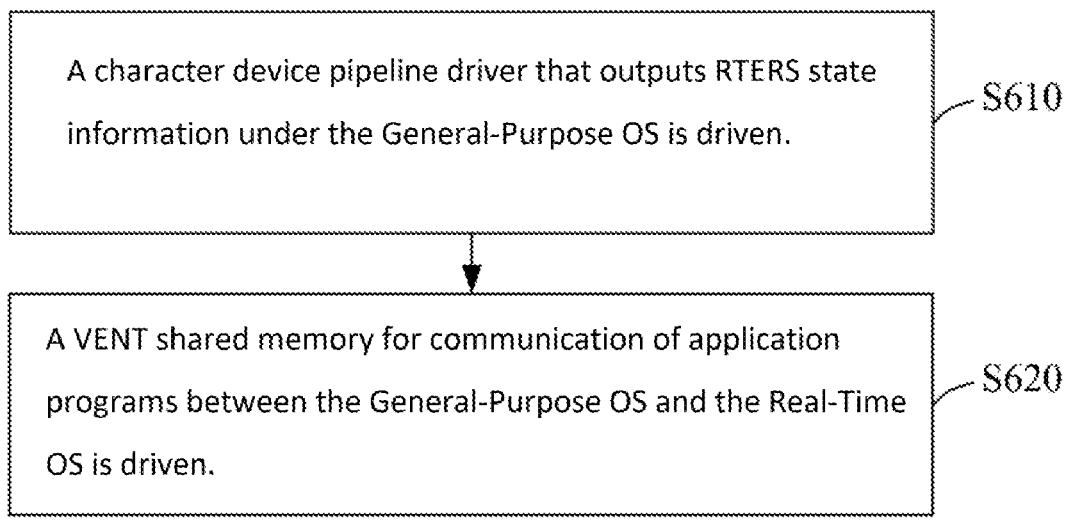
FIG. 6 is a flowchart for driving an RTERS virtual device according to an embodiment of the present invention.

Please refer to FIG. 6. FIG. 6 is a flowchart for driving an RTERS virtual device according to an embodiment of the present invention. The step of driving the RTERS virtual device includes the following sub-steps.

Step S610: A character device pipeline driver that outputs RTERS state information under the General-Purpose OS is driven.

Step S620: A VENT shared memory for communication of application programs between the General-Purpose OS and the Real-Time OS is driven.

Figure 7:
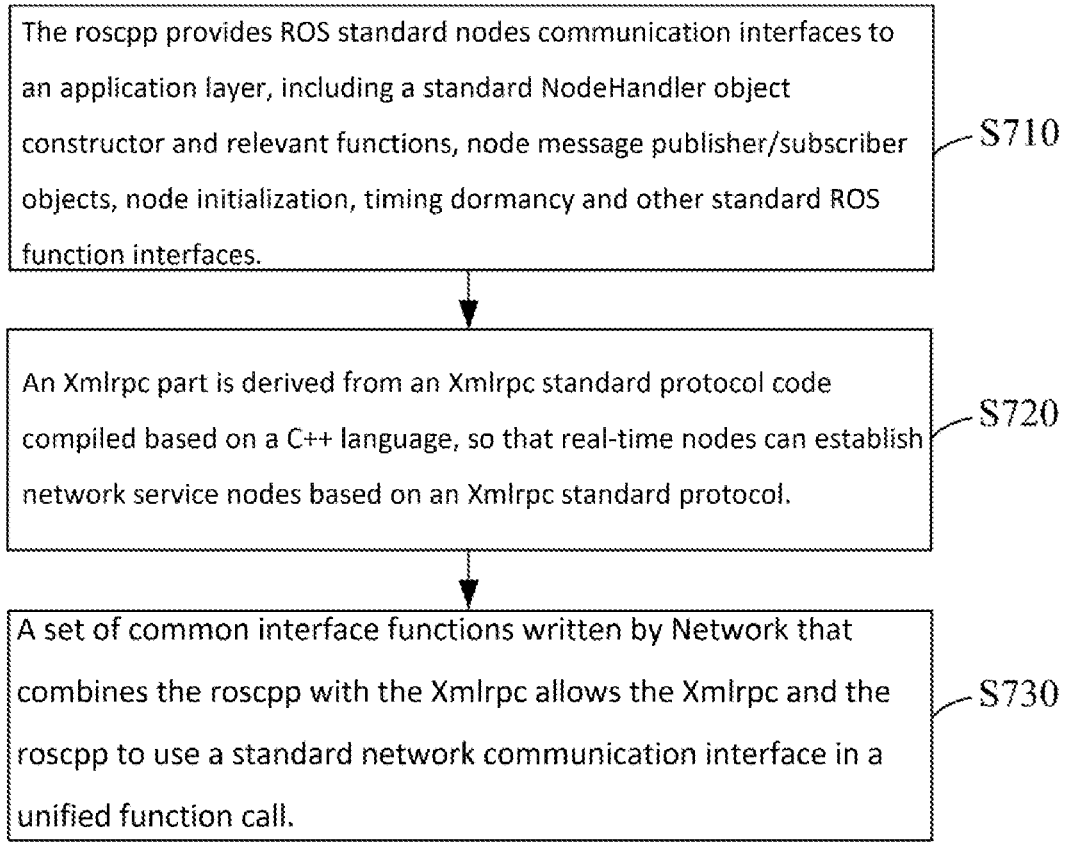
FIG. 7 is a flowchart for transporting an ROS in an RTERS via an RTROSCPP according to an embodiment of the present invention.

Please refer to FIG. 7. FIG. 7 is a flowchart for transporting an ROS in an RTERS via an RTROSCPP according to an embodiment of the present invention. The method for transporting the ROS in the RTERS via the RTROSCPP includes the following sub-steps.

Step S710: The roscpp provides ROS standard nodes communication interfaces to an application layer, including a standard NodeHandler object constructor and relevant functions, node message publisher/subscriber objects, node initialization, timing dormancy and other standard ROS function interfaces.

Step S720: An Xmlrpc part is derived from an Xmlrpc standard protocol code compiled based on a C++ language, so that real-time nodes can establish network service nodes based on an Xmlrpc standard protocol.

Step S730: A set of common interface functions written by Network that combines the roscpp with the Xmlrpc allows the Xmlrpc and the roscpp to use a standard network communication interface in a unified function call.

With the above technical solutions, the present invention has the following beneficial effects: the whole hardware platform resources are divided into kernels and partitions based on Asymmetric Multi-Processing (AMP); meanwhile, the stable and reliable communication between subsystems is supported; wherein one of the two sub-systems is Linux of a General-Purpose OS type, and the other of the two sub-systems is RTERS of an Real-Time OS type. Based on the AIRT-ROS architecture provided by the present invention, Linux and RTERS can respectively execute the non-real-time process and the real-time process; Linux and RTERS can respectively respond the IRQ of the non-real-time device and the IRQ of the real-time device; communications between the non-real-time process and the real-time process are supported; and a variety of drives of Linux are integrated; and therefore, the workload for driving the general-purpose external devices is greatly reduced.

The foregoing outlines features of several embodiments so that those skilled in the art may better understand the aspects of the present invention. Those skilled in the art should appreciate that they may readily use the present invention as a basis for designing or modifying other processes and structures for carrying out the same purposes and/or achieving the same advantages of the embodiments introduced herein. Those skilled in the art should also realize that such equivalent constructions do not depart from the spirit and scope of the present invention, and that they may make various changes, substitutions, and alterations herein without departing from the spirit and scope of the present invention.

What is claimed is:

1. An operation method of an Intelligent Real-Time Robot Operating System (IRT-ROS) architecture the IRT ROS architecture comprising a General-Purpose OS kernel for running a General-Purpose OS to execute a non-real-time process, a Real-Time OS kernel for running a Real-Time OS to execute a real-time process, an Inter-Processor Interrupt (IPI) interface for supporting communication between the non-real-time process and the real-time process, and an external I/O Advanced Programmable Interrupt Controller (I/O APIC) connected to the General-Purpose OS kernel and the Real-Time OS kernel, the operation method comprising the following steps:

a first Local Advanced Programmable Interrupt Controller (LAPIC) of the General-Purpose OS kernel responding to non-real-time Interrupt Requests (IRQs) of non-real-time devices via the external I/O APIC, and a second LAPIC of the Real-Time OS kernel responding to real-time IRQs of real-time devices via the external I/O APIC;

when only the non-real-time devices are connected to the IRT-ROS architecture, blocking the real-time IRQs from the real-time devices in the Real-Time OS kernel, so that the General-Purpose OS kernel completely takes charge of an IRQ line;

when only the real-time devices are connected to the IRT-ROS architecture, the IRT-ROS architecture configuring the external I/O APIC, and the external I/O APIC statically sending the real-time IRQs to the Real-Time OS kernel by static distribution, so that the Real-Time OS kernel completely takes charge of the IRQ line;

when the real-time IRQs and the non-real-time IRQs are simultaneously provided on the IRQ line, routing all of the real-time IRQs and the non-real-time IRQs on the IRQ line to a dedicated OS kernel, the dedicated OS kernel being the General-Purpose OS kernel or the Real-Time OS kernel, so that the dedicated OS kernel completely takes charges of the IRQ line;

communicating an RTROSCPP of the IRT-ROS architecture with ROS nodes, and respectively running the ROS nodes, core services and roslog topics on the General-Purpose OS kernel and the Real-Time OS kernel;

publishing/subscribing messages between the ROS nodes via a Fast Real-Time Publish/Subscribe protocol (Fast-RTPS); and implementing the roslog topics at the RTROSCPP, and taking the roslog topics as standard outputs for the IRT-ROS architecture, such that all of the ROS nodes output information of the ROS nodes by invoking standard log services of the ROS nodes.

2. The operation method of an IRT-ROS according to claim 1, further comprising:

when real-time nodes are started, communicating the real-time nodes, via a virtual network shared memory (VENT shared memory), with the ROS nodes run on the General-Purpose OS kernel;

wherein a communication scenario comprises: when a real-time node is started and stopped, a state message is published to other ROS nodes on the General-Purpose OS kernel; and when a real-time node is communicated with a non-real-time node, topics are published/subscribed and messages are exchanged.

3. The operation method of an IRT-ROS according to claim 2, further comprising:

driving an RTERS virtual device, comprising the following sub-steps:

driving a character device pipeline driver that outputs RTERS state information under the General-Purpose OS; and driving a VENT shared memory for communication of application programs between the General-Purpose OS and the Real-Time OS.

4. The operation method of an IRT-ROS according to claim 1, further comprising:

transporting the ROS in the RTERS via the RTROSCPP, comprising the following sub-steps:

providing, via the roscpp, ROS standard nodes communication interfaces to an application layer, including a standard NodeHandler object constructor and relevant functions, node message publisher/subscriber objects, node initialization, timing dormancy and other standard ROS function interfaces;

deriving an Xmlrpc part from an Xmlrpc standard protocol code compiled based on a C++ language, so that real-time nodes establish network service nodes based on an Xmlrpc standard protocol; and a set of common interface functions written by Network that combines the roscpp with the Xmlrpc allowing the Xmlrpc and the roscpp to use a standard network communication interface in a unified function call.

5. The operation method of an IRT-ROS according to claim 1, wherein the ROS node is used for managing nodes running on the IRT-ROS, comprising start registration of the nodes, node status, communication requests between the nodes, and node message routing; and the ROS node uses Xmlrpc standard protocol to communicate with other ROS nodes.

6. The operation method of an IRT-ROS according to claim 1, wherein the General-Purpose OS is Linux, and the Real-Time OS is Real-Time Executive for Robotic Systems (RTERS).

* * * * *